United States Patent [19]

Kato

[11] Patent Number: 5,714,572
[45] Date of Patent: Feb. 3, 1998

[54] POLYIMIDE RESIN COMPOSITION

[75] Inventor: Hideto Kato, Takasaki, Japan

[73] Assignee: Shin-Etsu Chemical Co., Ltd., Tokyo, Japan

[21] Appl. No.: 731,987

[22] Filed: Oct. 23, 1996

[30] Foreign Application Priority Data

Oct. 24, 1995 [JP] Japan .................................. 7-299148

[51] Int. Cl.$^6$ ........................... C08G 69/26; C08G 73/10
[52] U.S. Cl. ................... 528/310; 528/26; 528/28; 528/38; 528/41; 528/125; 528/126; 528/128; 528/172; 528/173; 528/185; 528/188; 528/189; 528/220; 528/229; 528/352; 528/353; 525/431; 524/600; 524/606; 428/473.5
[58] Field of Search ...................... 528/125, 126, 528/353, 38, 128, 172, 188, 189, 173, 208, 220, 229, 352, 28, 41; 524/600, 606; 525/431; 428/473.5

[56] References Cited

U.S. PATENT DOCUMENTS

| | | | |
|---|---|---|---|
| 4,520,075 | 5/1985 | Igarashi et al. | 428/435 |
| 4,672,099 | 6/1987 | Kunimune et al. | 528/26 |
| 4,931,539 | 6/1990 | Hayes | 528/353 |
| 4,954,612 | 9/1990 | Nomura et al. | 528/353 |
| 5,089,549 | 2/1992 | Kato | 524/600 |
| 5,252,703 | 10/1993 | Nakajima et al. | 525/423 |
| 5,300,627 | 4/1994 | Kunimune et al. | 528/353 |
| 5,304,626 | 4/1994 | Burgess et al. | 528/183 |

Primary Examiner—P. Hampton-Hightower
Attorney, Agent, or Firm—Oblon, Spivak, McClelland, Maier & Neustadt, P.C.

[57] ABSTRACT

The present invention provides a polyimide resin composition comprising:

(a) a polyamide resin comprising a repeating unit represented by the general formula (1):

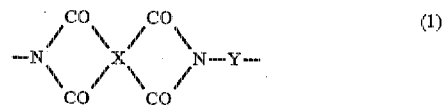

(1)

wherein
X represents a tetravalent organic group represented by the formula (2):

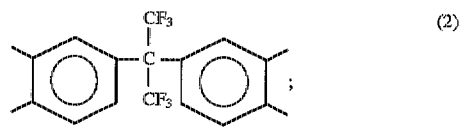

(2)

Y represents a divalent organic group comprising a divalent siloxane residual group represented by the formula (3):

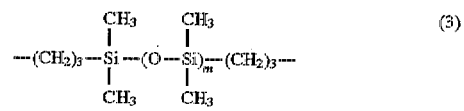

(3)

wherein m is an integer of 60 to 120;
and a divalent aromatic group represented by the formula (4):

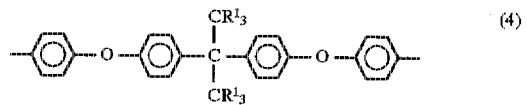

(4)

wherein $R^1$ represents a hydrogen atom or a fluorine atom; and (B) cyclohexanone. From this composition, polyimide resin films can be obtained by heating at a lower temperature for a short time, and the films obtained show good adhesion under moisture-resistant conditions.

10 Claims, No Drawings

POLYIMIDE RESIN COMPOSITION

BACKGROUND OF THE INVENTION

1. Field of the Invention

This invention relates to a polyimide resin composition, and more particularly to a polyimide resin composition from which an excellent cured product can be obtained by low-temperature and short-time heating.

2. Description of the Prior Art

Polyimide resins having good heat resistance are soluble only in some high-boiling organic solvents. Hence, when such resins are used as coating materials for electronic parts and so forth, it is common to once dissolve the precursor polyamic acid in an organic solvent, coat the resulting solution on a base material so as to be formed into a thin film, followed by heating at a high temperature for a long time to cause the coating to cure. This is exemplified by a method in which tetracarboxylic acid dianhydride and an aromatic diamine are subjected to addition reaction in an organic polar solvent to produce a polyamic acid, and its solution is coated on a base material (e.g., electronic parts) so as to be formed into a thin film, followed by heating at a high temperature of 300° C. or above for a long time to effect dehydration to convert the coating to a polyimide.

This method, however, requires heating at a high temperature for a long time in order to dehydrate the polyamic acid so as to be converted to polyimide when the polyimide film is formed, and in order to completely remove the high-boiling organic solvent. Hence, the electronic parts or the like on the surfaces of which resin films are formed tend to cause a heat deterioration. When on the other hand the heating is insufficiently made, polyamic acid remains in the structure of the resulting resin film, and this polyamic acid tends to cause a lowering of moisture resistance, corrosion resistance and so forth of the polyimide resin. Especially when polyimide resin films are used as protective films of electronic parts, the lowering of moisture resistance, corrosion resistance and so forth results in deterioration and short lifetime of the electronic parts.

As a countermeasure therefor, a method is studied in which not the polyamic acid solution but a solution of a polyimide resin soluble in an organic solvent is coated, followed by heating to evaporate the solvent to form a polyimide resin film. More specifically, it is proposed to use a polyimide resin obtained by allowing a tetracarboxylic acid dianhydride having a siloxane bond to react with a specific diamine, which resin is soluble in polar solvents such as N-methyl-2-pyrrolidone, diglyme (diglycol methyl ether) and cyclohexane (Japanese Unexamined Patent Publications No. 61-83228, No. 61-118424, No. 61-118425 and No. 2-36232.

However, the above polar solvents such as N-methyl-2-pyrrolidone have so high a moisture absorption that it absorbs moisture when the resin solution is coated on the base material, bringing about the disadvantages that the polyimide resin film formed may become cloudy and also the resulting film may have a low strength. Moreover, the polar solvents such as N-methyl-2-pyrrolidone have so high a boiling point that heat treatment must be made at a high temperature for a long time in order to completely remove the solvent.

The diglyme and so forth are also known to adversely affect human bodies, and are not suitable for their use as solvents.

Accordingly, the present applicants have ever proposed a polyimide siloxane resin which makes it possible to use as a main solvent cyclohexanone, having a relatively low boiling point and having a low toxicity to human bodies (Japanese Unexamined Patent Publication No. 201005/1989).

The above polyimide siloxane resin, however, has a poor adhesion to base materials. Although resins are required to have a high moisture resistance in adhesion especially when applied in electronic parts, this polyimide siloxane resin has an insufficient adhesion durability.

SUMMARY OF THE INVENTION

This invention was made in order to eliminate the above disadvantages in the prior art. More specifically, a subject of the present invention is to provide a polyimide resin composition promising a superior adhesion and adhesion durability to base materials in an environment of high humidity and can form a polyimide resin film by relatively low-temperature and short-time heating.

To settle such a subject, the present invention provides a polyimide resin composition comprising;

(A) a polyimide resin comprising a repeating unit represented by the general formula (1):

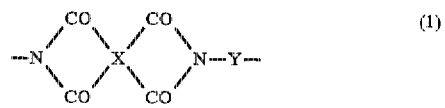

wherein

X represents a tetravalent organic group containing as an essential constituent group not less than 50 mol % of a 2,2-diphenyl perfluoropropane residual group represented by the formula (2):

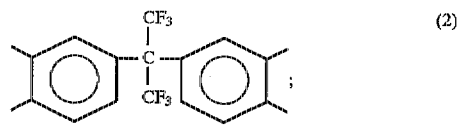

Y represents a divalent organic group comprising from 2 mol % to 10 mol % of a divalent siloxane residual group represented by the formula (3):

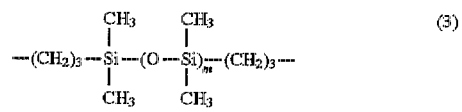

wherein m is an integer of 60 to 120;

and from 90 mol % to 98 mol % of a divalent aromatic group selected from the group consisting of a divalent aromatic group represented by the formula (4):

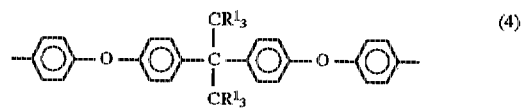

wherein $R^1$ represents a hydrogen atom or a fluorine atom; and a divalent aromatic group represented by the formula (5):

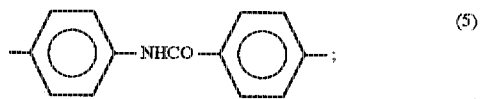

provided that the aromatic group of formula (4) is in an amount of from 50 mol % to 100 mol % in the total of the aromatic group of formula (4) and aromatic group of formula (5); and (B) cyclohexanone.

The polyimide resin composition used in the composition of the present invention has no functional group remaining unreacted, and hence the composition obtained has a high storage stability. Also, since the main solvent for the polyimide resin is cyclohexanone, which is relatively highly volatile, a polyimide resin film can be readily obtained by heating at a low temperature for a short time. In an instance where the diamine component in the polyimide resin contains a structure originating from 4,4'-diaminobenzanilide, no problem may arise such that the smoothness of a coating hitherto becomes poor as a result of moisture absorption of solution when solutions prepared by dissolving polyimide resin in a solvent are coated on base materials.

The present polyimide resin composition also exhibits a good adhesion to base materials including metals such as nickel and copper, silicon-containing materials such as silicon wafers, and glass, even under moisture-resistant conditions. Hence, this composition is useful for the formation of coating films especially on electronic parts and so forth. For example, the present composition can be widely used to form films on semiconductor devices, stated specifically, passivation films and protective films on the surfaces of semiconductor devices, junction protective films at the junctions of diodes, transistors and so forth, alpha-rays barrier films and interlayer insulating films of VLSIs, ion implantation masks, conformal coats of printed circuit boards, orientation films of liquid-crystal display devices, protective films of glass fibers, and surface protective films of solar cells.

DESCRIPTION OF THE PREFERRED EMBODIMENTS

The polyimide resin composition of the present invention is constituted basically of (A) the polyimide resin comprising the repeating unit shown above and (B) a solvent.

(A) Polyimide Resin

The component-(A) polyimide resin is constituted of the repeating unit represented by the general formula (1).

The tetravalent organic group X of the general formula (1) contains not less than 50 mol %, more specifically from 50 to 100 mol %, and preferably from 70 to 80 mol %, of the 2,2-diphenyl perfluoropropane residual group represented by the formula (2). This tetravalent organic group X may be constituted of the 2,2-diphenyl perfluoropropane residual group in its entirety, or, besides this group, may contain other tetravalent organic group(s) in an amount not more than 50 mol %, i.e., 0 to 50 mol %, and preferably from 20 to 30 mol %.

If the amount of the 2,2-diphenyl perfluoropropane residual group of formula (2) in the tetravalent organic group X is less than 50 mol %, no sufficient solubility of the polyimide resin in cyclohexanone may be obtained.

The tetravalent organic group other than the 2,2-diphenyl perfluoropropane residual group of formula (2), which may be contained in the tetravalent organic group X, can be exemplified by the following.

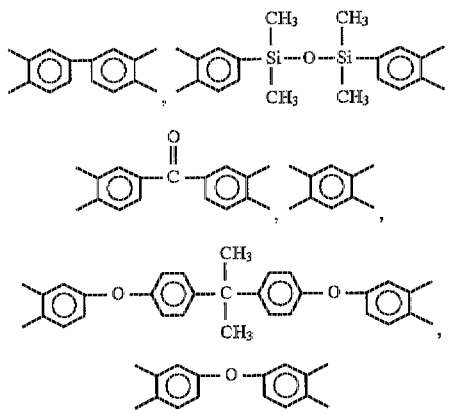

Of these, a siloxane-containing group represented by the formula (6):

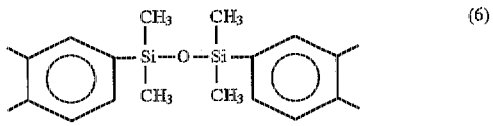

and a biphenyl residual group represented by the formula

are preferred.

The presence of at least one of the group of formula (6) and the group of formula (7) is advantageous in that the former can decrease the modulus of elasticity of the film formed and the latter can improve the strength of the film formed.

The tetravalent organic group other than the group of formula (2), exemplified in the above, may be present alone, or in combination of two or more kinds.

The divalent organic group represented by Y in the general formula (1) is constituted of the group of formula (3), the group of formula (4), and optionally the group of formula (5).

The group represented by Y may preferably consist of from 2 to 10 mol % of the group of formula (3) and from 90 to 98 mol % of the group of formula (4). Alternatively, the group represented by Y may contain from 2 to 10 mol % of the group of formula (3) and the remainder being constituted of the group of formula (4) and the group of formula (5), where the group of formula (4) is in an amount not less than 50 mol % (i.e., the group of formula (5) is in an amount not more than 50 mol %). In particular, the group of formula (5) may preferably in an amount ranging from 10 to 50 mol %. The divalent aromatic group of formula (5) contains —NH—CO— group which is hydrophilic; therefore, when a solution of the resin is coated on a substrate, whitening of the resulting film caused by moisture absorption would occur with difficulty, and adhesion of the film to the substrate can be increased by hydrogen bonding.

The divalent siloxane residual group represented by the formula (3) is in an amount of from 2 to 10 mol %, and preferably from 3 to 5 mol %. If this siloxane residual group is in an amount less than 2 mol %, no adhesion of the polyimide resin to the base material may be obtained. On the other hand, if it is in an amount more than 10 mol %, the polyimide resin may dissolve in the essential solvent cyclohexanone with difficulty. Letter symbol m in the formula (3) represents the number of repetition of the dimethylsiloxane unit, and is an integer of from 60 to 120. If the value of m turns outside this range, the polyimide resin may no longer be well soluble in cyclohexanone.

Meanwhile, in the case when the remaining groups, i.e., the aromatic group of formula (4) and the aromatic group of formula (5) are present, the former and the latter are in an amount of from 90 to 98 mol % in total.

If a group or groups other than the aromatic group of formula (4) and aromatic group of formula (5) is/are contained as the remaining group(s) other than the group of formula (3), there may be a disadvantage that no sufficient solubility in cyclohexanone can be obtained.

In the case when the aromatic group represented by the formula (5) is present, the aromatic group of formula (5) is in an amount of from 10 mol % to 50 mol %, and preferably from 10 mol % to 30 mol %, in the total of the aromatic group of formula (4) and aromatic group of formula (5). This advantageously brings about an improvement in smoothness of polyimide resin films obtained using the composition of the present invention. More specifically, although the smoothness of coatings just formed by coating and also cured resin films may be damaged as a result of moisture absorption of the solution when the composition in the form of a solution is coated on base materials, this can be effectively prevented.

The presence of the aromatic group of formula (5) in an excessively large amount may cause a decrease in solubility of the polyimide resin [component (A)] in solvents.

The polyimide resin may preferably have a molecular weight of from 10,000 to 200,000, and particularly preferably from 20,000 to 150,000, as weight average molecular weight. If the resin has a too small weight average molecular weight, no sufficient strength may be obtained when the resin composition is coated on base materials to form protective films. On the other hand, if it has a too large molecular weight, the solution obtained by dissolving the resin in a mixed solvent may become too highly viscous to be coated on base materials with ease.

The component-(A) polyimide resin can be produced, e.g., in the following way.

A tetracarboxylic acid dianhydride represented by the general formula (8):

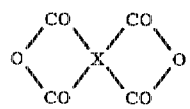

wherein X is as defined previously;
a diaminosiloxane represented by the formula (9):

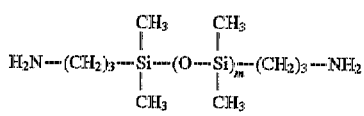

wherein m is as defined previously;

and diamine components comprised of an aromatic diamine represented by the formula (10):

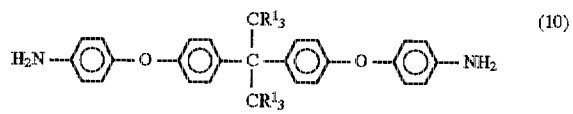

wherein $R^1$ is as defined previously;

and optionally an aromatic diamine represented by the formula (11):

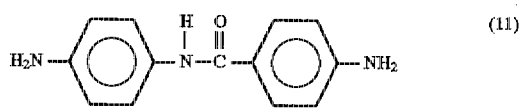

are charged into a solvent such as cyclohexanone, and are allowed to react at a low temperature, i.e., at about 50° to 60° C., to synthesize a polyamic acid resin, which is the precursor of the polyimide resin.

Here, the proportion of the diamine component to the tetracarboxylic acid dianhydride may preferably be in the range of from 0.95 to 1.05, and more preferably from 0.98 to 1.02.

Subsequently, the temperature of the polyamic acid resin solution thus obtained is raised to a temperature in the range of from 80° to 200° C., and preferably from 140° to 180° C., so that dehydration ring-closure reaction proceeds at the acid amide moiety of the polyamic acid and the intended polyimide resin composition is obtained in the form of a solution.

There is another method in which a solution of a mixture of acetic anhydride and pyridine is added to a polyamic acid solution, and then the temperature of the solution obtained is raised to about 50° C. so as to be converted to imide.

As the tetracarboxylic acid dianhydride represented by the formula (8), 2,2-bis(3,4-dicarboxyphenyl) perfluoropropane dianhydride represented by the formula:

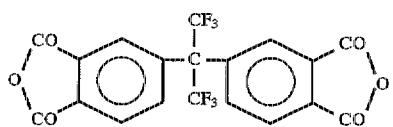

is essential, and a different tetracarboxylic acid dianhydride may be used in combination in accordance with the structure of the intended polyimide resin.

The different tetracarboxylic acid dianhydride optionally used in combination may include, e.g., the following.

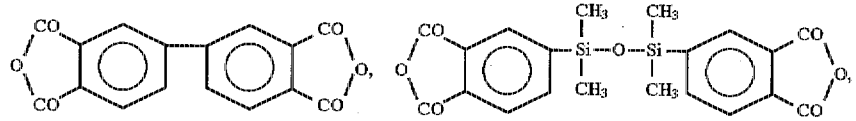

-continued

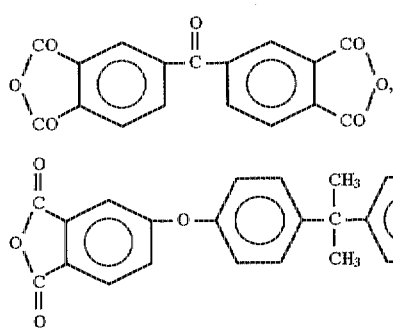
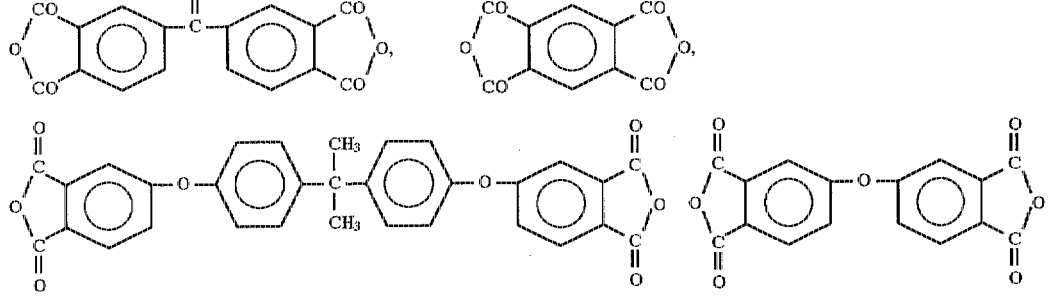

15

(B) Solvent

The solvent used in the composition of the present invention essentially includes cyclohexanone, and may optionally be a mixed solvent with a different solvent. In the solvent, the cyclohexanone may be in an amount of from to 100% by weight, and preferably from 50 to 100% by weight.

The solvent which may be used in combination with cyclohexanone includes ethers such as tetrahydrofuran and anisole, ketones such as diethyl ketone, methyl isobutyl ketone and acetophenone, esters such as butyl acetate, methyl benzoate and γ-butyrolactone, cellosolves such as butyl cellosolve acetate and propylene glycol monomethyl ether acetate, and aromatic hydrocarbons such as toluene and xylene. Ketones, esters and cellosolves are preferred, and γ-butyrolactone and propylene glycol monomethyl ether acetate are particularly preferred.

Any of these solvents may be used alone or in combination of two or more kinds.

The amount of the solvent contained in the composition of the present invention is controlled so that the concentration of polyimide resin is usually in the range of from 1 to 30% by weight, taking account of solubility of resin, workability at the time of coating, coating thickness and so forth.

The composition may be prepared so that it has a relatively high resin concentration when stored, and may be diluted to have an appropriate concentration when used.

The polyimide resin solution (composition) according to the present invention is different from conventional polyamic acid solutions, and does not require heating at a high temperature for a long time when dehydrated after coating. For example, after the polyimide resin solution is coated on base materials, the coatings formed may be heated at a temperature of from 150° to 200° C. for 180 to 60 minutes, so that polyimide resin films from which the solvent has been completely removed can be obtained.

EXAMPLES

Example 1

Preparation of polyimide resin:

Into a flask having a stirrer, a thermometer and a nitrogen replacing device, 22.2 g (0.05 mol) of 2,2-bis (3,4-dicarboxyphenyl)perfluoropropane dianhydride, 21.3 g (0.05 mol) of 1,3-bis(3,4-dicarboxyphenyl)-1,1,3,3-tetramethyldisiloxane dianhydride and 270 g of cyclohexanone were charged.

Subsequently, a solution prepared by dissolving 49.1 g (0.01 mol) of diaminosiloxane [the compound of formula (9) in which m is 64 on the average] and 36.9 g (0.09 mol) of 2,2-bis [4-(4-aminophenoxy)phenyl]propane in 120 g of cyclohexanone was dropwise added into the above flask while controlling the temperature of the reaction system so as not to become higher than 50° C. After the dropwise addition was completed, the mixture was further stirred at room temperature for 10 hours.

Next, a reflux condenser having an ester adaptor was attached to the flask. Thereafter, 30 g of xylene was added, and the temperature was raised to 150° C., which temperature was maintained for 6 hours. As a result, a yellowish brown solution was obtained. Also, 3.5 g of water was produced in the water acceptor.

The yellowish brown solution thus obtained was cooled to room temperature (25° C.), and thereafter put into methanol to effect re-sedimentation. The sediment obtained was dried to obtain 106 g of polyimide resin having a repeating unit represented by the formula:

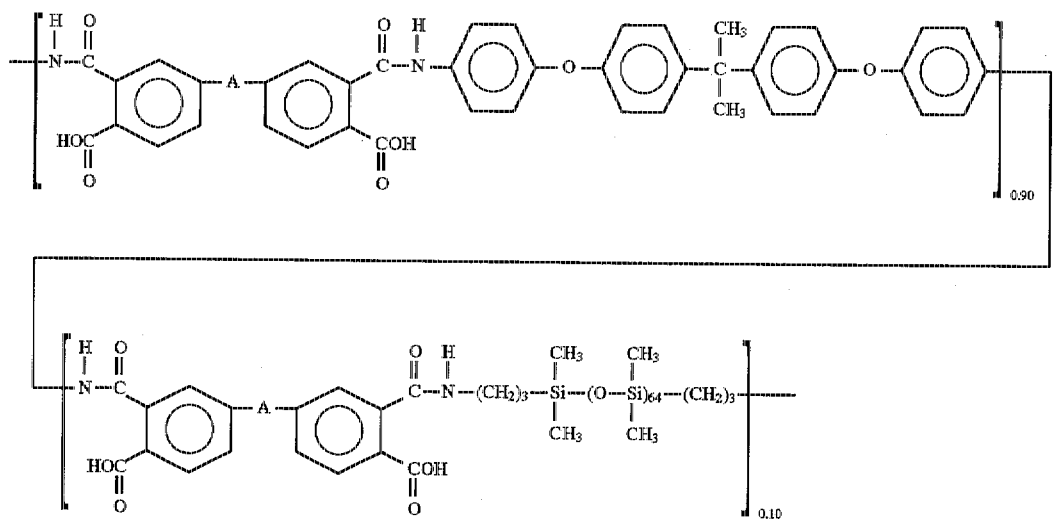

wherein A's are each independently a divalent organic group represented by the formula:

or

and having a molar ratio of (a)/(b) of 50/50.

An infrared absorption spectrum of the resin obtained by re-sedimentation was measured. As a result, the absorption based on polyamic acid showing that unreacted functional groups were present did not appear, and the absorption based on imide groups was confirmed at 1,780 $cm^{-1}$ and 1,720 $cm^{-1}$.

Weight average molecular weight (in terms of polystyrene) of the resin was measured by gel permeation chromatography (GPC) using tetrahydrofuran as solvent to reveal that it was 28,000.

Preparation of polyimide resin composition:

In 80 g of cyclohexanone, 20 g of the above resin was dissolved. As a result, it well dissolved, and a composition solution having a polyimide resin concentration of 20% by weight was obtained. To this composition solution, γ-butyrolactone was further added to prepare a dilute solution having a polyimide resin concentration of 12% by weight (in terms of solid matter).

Then, in respect of the dilute solution, its viscosity at 25° C. was measured at the time of preparation and 3 months thereafter. The results obtained are shown in Table 1.

Formation of polyimide resin films:

The above dilute solution was coated on base materials comprised of $SiO_2$ formed on silicon wafers and base materials made of copper, followed by drying to form coatings, and further followed by heating to obtain cured polyimide resin films. Their adhesion to the base materials under moisture-resistant conditions was tested according to the following procedure.

First, the temperature of coatings was raised to 180° C., which temperature was maintained for 1 hour to form cured resin films. The cured resin films formed were examined by a pressure cooker test under conditions of 121° C., 2 atmosphere and 24 hours, and their adhesion was evaluated by a cross cut peel test (JIS 5400).

The results of the cross cut peel test were 100/100, showing an excellent adhesion.

Example 2

A polyimide resin having a repeating unit represented by the formula:

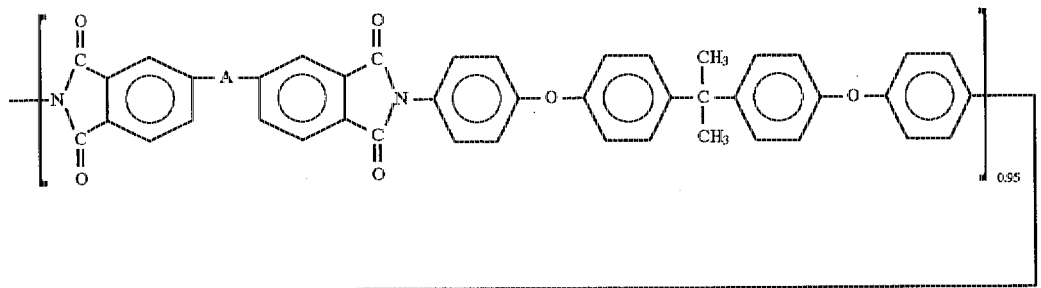

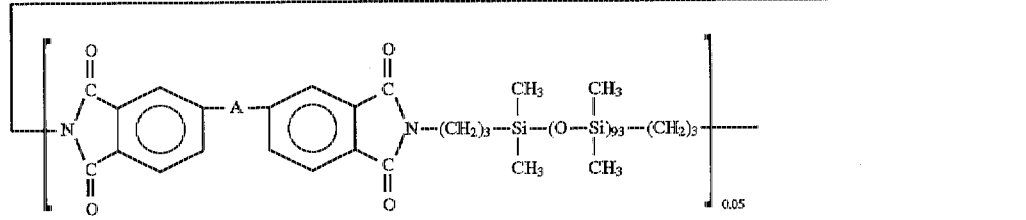

wherein A's are each independently a divalent organic group represented by the formula:

(a):

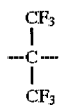

or (b):

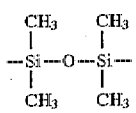

and having a molar ratio of (a)/(b) of 70/30; was prepared under the same conditions (conditions for polycondensation reaction) as in Example 1 except that 31.1 g (0.07 mol) of 2,2-bis(3,4-dicarboxyphenyl) perfluoropropane dianhydride and 12.8 g (0.03 mol) of 1,3-bis (3,4-dicarboxyphenyl)-1,1,3,3-tetramethyldisiloxane dianhydride, as well as 35.3 g (0.005 mol) of diaminosiloxane [the compound of formula (9) in which m is 93 on the average] and 39.0 g (0.095 mol) of 2,2-bis[4-(4-aminophenoxy)phenyl]propane, and also 470 g of cyclohexanone were used.

Weight average molecular weight of the resin thus obtained was measured in the same manner as in Example 1 to reveal that it was 48,000.

Next, a polyimide resin composition solution having a polyimide resin concentration of 20% by weight was prepared in the same manner as in Example 1. To the solution, γ-butyrolactone was further added to prepare a polyimide resin composition dilute solution having a polyimide resin concentration of 12% by weight.

Changes with time of the viscosity of this dilute solution were examined and cured polyimide resin films were tested in the same manner as in Example 1. The results obtained are shown in Table 1.

Example 3

A polyimide resin having a repeating unit represented by the formula:

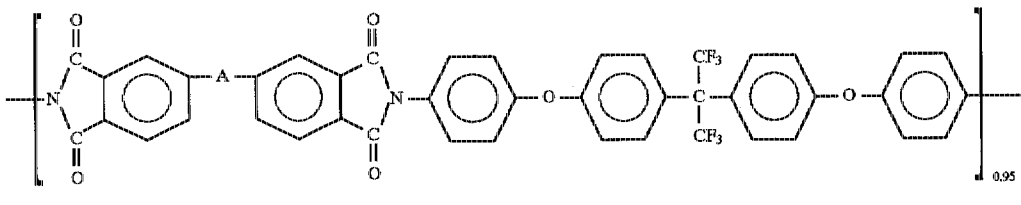

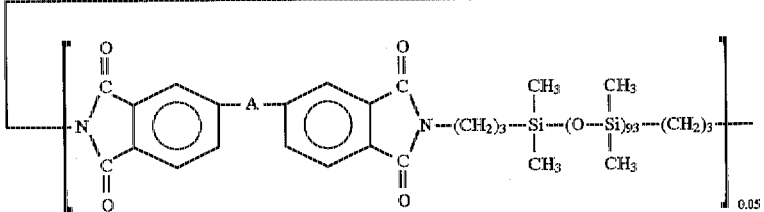

wherein A's are each independently a divalent organic group represented by the formula:

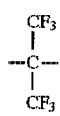

or a single bond, and having a molar ratio of the divalent organic group (a)/single bond of 80/20;

was prepared under the same conditions (conditions for polycondensation reaction) as in Example 1 except that 35.5 g (0.08 mol) of 2,2-bis(3,4-dicarboxyphenyl) perfluoropropane dianhydride, 5.9 g (0.02 mol) of 3,3',4,4'-biphenyltetracarboxylic acid dianhydride, 35.3 g (0.005 mol) of diaminosiloxane [the compound of formula (9) in which m is 93 on the average], 49.3 g (0.095 mol) of 2,2-bis[4-(4-aminophenoxy)phenyl]perfluoropropane, and 720 g of cyclohexanone were used.

Weight average molecular weight of the resin thus obtained was measured in the same manner as in Example 1 to reveal that it was 121,000.

Next, a polyimide resin composition solution having a polyimide resin concentration of 20% by weight was prepared in the same manner as in Example 1. To the solution, γ-butyrolactone was further added to prepare a polyimide resin composition dilute solution having a polyimide resin concentration of 12% by weight.

Changes with time of the viscosity of this dilute solution were examined and cured polyimide resin films were tested in the same manner as in Example 1. The results obtained are shown in Table 1.

Example 4

A polyimide resin having a repeating unit represented by the formula:

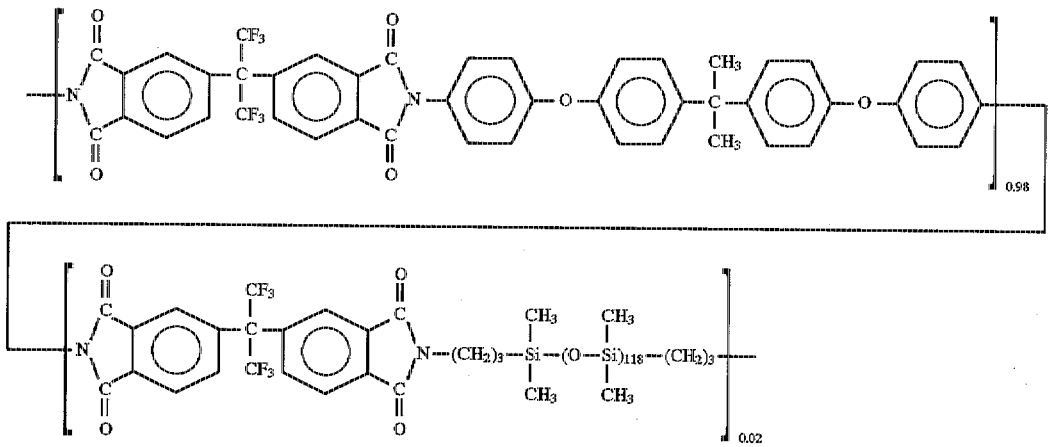

was prepared under the same conditions (conditions for polycondensation reaction) as in Example 1 except that 44.4 g (0.1 mol) of 2,2-bis(3,4-dicarboxyphenyl) perfluoropropane dianhydride, as well as 17.5 g (0.002 mol) of diaminosiloxane [the compound of formula (9) in which m is 118 on the average] and 40.2 g (0.098 mol) of 2,2-bis[4-(4-aminophenoxy)phenyl]propane, and also 410 g of cyclohexanone were used.

Weight average molecular weight of the resin thus obtained was measured in the same manner as in Example 1 to reveal that it was 84,000.

Next, a polyimide resin composition solution having a polyimide resin concentration of 20% by weight was prepared in the same manner as in Example 1. To the solution, γ-butyrolactone was further added to prepare a polyimide resin composition dilute solution having a polyimide resin concentration of 12% by weight.

Changes with time of the viscosity of this dilute solution were examined and cured polyimide resin films were tested in the same manner as in Example 1. The results obtained are shown in Table 1.

Comparative Example 1

A polyimide resin having a repeating unit represented by the formula:

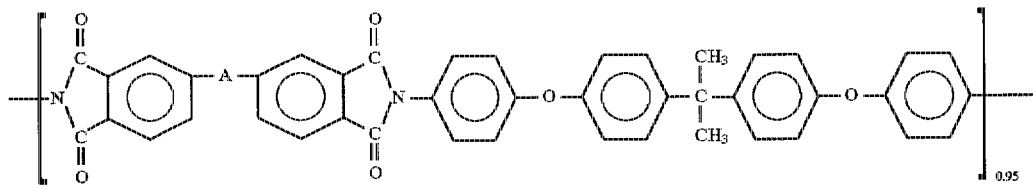

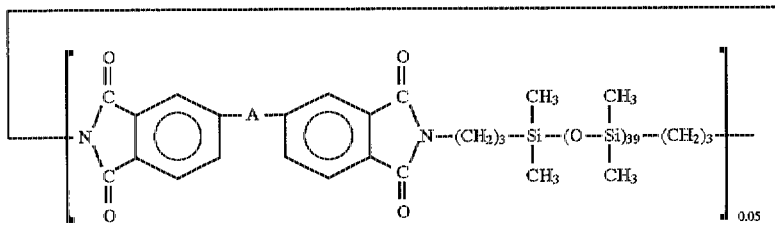

wherein A's are each independently divalent a organic group represented by the formula:

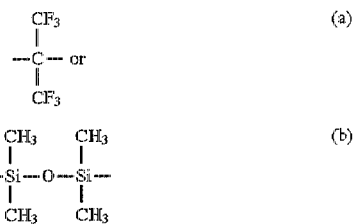

and having a molar ratio of (a)/(b) of 70/30; was prepared under the same conditions (conditions for polycondensation reaction) as in Example 1 except that 31.1 g (0.07 mol) of 2,2-bis(3,4-dicarboxyphenyl) perfluoropropane dianhydride and 12.8 g (0.03 mol) of 1,3-bis (3,4-dicarboxyphenyl)-1,3,3-tetramethyldisiloxane dianhydride, as well as 15.3 g (0.005 mol) of diaminosiloxane [the compound of formula (9) in which m is 39 on the average] and 39.0 g (0.095 mol) of 2,2-bis [4-(4-aminophenoxy)phenyl]propane, and also 440 g of cyclohexanone were used.

Weight average molecular weight of the resin thus obtained was measured in the same manner as in Example 1 to reveal that it was 53,000.

It was attempted to dissolve the resulting resin in cyclohexanone, but no transparent and uniform solution was obtainable.

Next, a polyimide resin composition solution having a polyimide resin concentration of 20% by weight was prepared in the same manner as in Example 1. To the solution, γ-butyrolactone was further added to prepare a polyimide resin composition dilute solution having a polyimide resin concentration of 12% by weight.

Changes with time of the viscosity of this dilute solution were examined and cured polyimide resin films were tested in the same manner as in Example 1. The results obtained are shown in Table 1.

Comparative Example 2

A polyimide resin having a repeating unit represented by the formula:

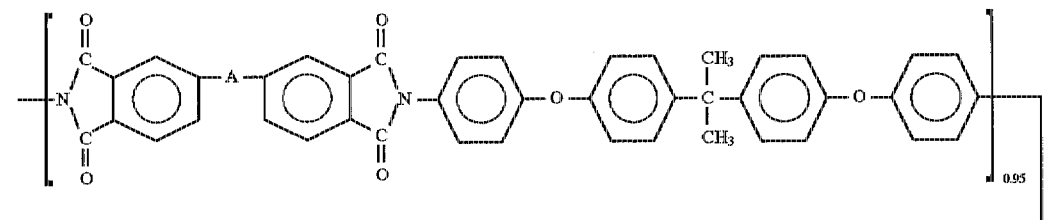

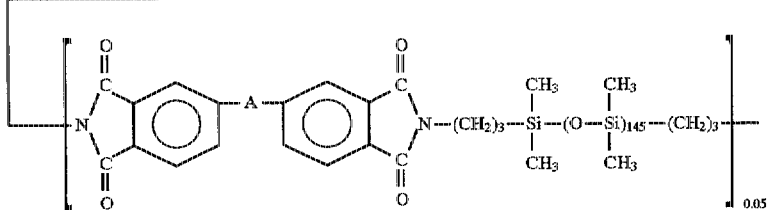

wherein A's are each independently a divalent organic group represented by the formula:

or a single bond, and having a molar ratio of divalent organic group (a)/single bond of 80/20;

was prepared under the same conditions (conditions for polycondensation reaction) as in Example 1 except that 35.5 g (0.08 mol) of 2,2-bis(3,4-dicarboxyphenyl) perfluoropropane dianhydride and 5.9 g (0.02 mol) of 3,3',4,4'-biphenyltetracarboxylic acid dianhydride, as well as 54.5 g (0.005 mol) of diaminosiloxane [the compound of formula (9) in which m is 145 on the average] and 39.0 g (0.095 mol) of 2,2-bis[4-(4-aminophenoxy)phenyl]propane, and also 550 g of cyclohexanone were used.

This resin did not uniformly dissolve in cyclohexanone, and it was impossible to prepare any polyimide resin composition solution.

The resin was also insoluble in the solvent tetrahydrofuran, and hence it was impossible to determine the molecular weight of the resin by gel permeation chromatography.

Comparative Example 3

A polyimide resin having a repeating unit represented by the formula:

or a single bond, and having a molar ratio of divalent organic group (a)/single bond of 40/60;

was prepared under the same conditions (conditions for polycondensation reaction) as in Example 1 except that 17.8 g (0.04 mol) of 2,2-bis(3,4-dicarboxyphenyl) perfluoropropane dianhydride and 17.6 g (0.06 mol) of 3,3',4,4'-biphenyltetracarboxylic acid dianhydride, as well as 35.3 g (0.005 mol) of diaminosiloxane [the compound of formula (9) in which m is 93 on the average] and 39.0 g (0.095 mol) of 2,2-bis[4-(4-aminophenoxy)phenyl]propane, and also 470 g of cyclohexanone were used.

This resin did not uniformly dissolve in cyclohexanone, and it was impossible to prepare any polyimide resin composition solution.

The resin was also insoluble in the tetrahydrofuran solvent, and hence, like Comparative Example 2, it was impossible to determine the molecular weight of the resin by gel permeation chromatography.

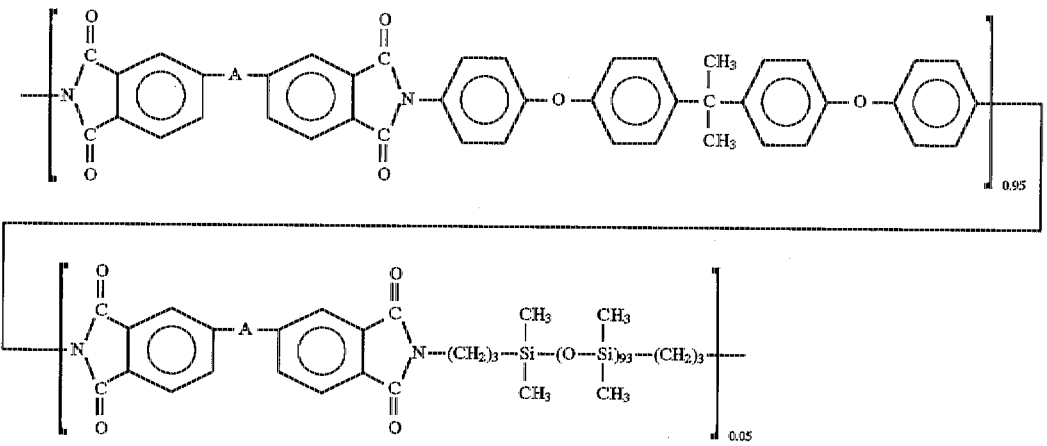

wherein A's are each independently a divalent organic group represented by the formula:

TABLE 1

| Acid dianhydride (mol) | | | Diamine (mol) | | | Solubility in cyclohexanone | Viscosity of dilute solution (cP) | | Film adhesion** | |
|---|---|---|---|---|---|---|---|---|---|---|
| | | | | | | | After 3 months | At preparation | Base material: SiO$_2$ | Base Material: copper |
| (1) | (2) | (3) | m* | (4) | (5) | | | | | |
| Example | | | | | | | | | | |
| 1 | 0.05 | 0.05 | ---- | 64 | 0.01 | 0.090 | Good | 65 | 65 | 100/100 | 100/100 |
| 2 | 0.07 | 0.03 | ---- | 93 | 0.005 | 0.095 | Good | 80 | 80 | 100/100 | 100/100 |
| 3 | 0.08 | ---- | 0.02 | 93 | 0.005 | 0.095 | Good | 175 | 175 | 100/100 | 100/100 |
| 4 | 0.10 | ---- | ---- | 118 | 0.002 | 0.098 | Good | 130 | 130 | 100/100 | 100/100 |

TABLE 1-continued

| | Acid dianhydride (mol) | | | Diamine (mol) | | | Solubility in cyclohexanone | Viscosity of dilute solution (cP) | | Film adhesion** Base material: SiO₂ | Base Material: copper |
|---|---|---|---|---|---|---|---|---|---|---|---|
| | (1) | (2) | (3) | m* | (4) | (5) | | After 3 months | At preparation | | |
| Comparative Example | | | | | | | | | | | |
| 1 | 0.07 | 0.03 | — | 39 | 0.005 | 0.095 | Good | 95 | 95 | 0/100 | 20/100 |
| 2 | 0.08 | — | 0.02 | 145 | 0.005 | 0.095 | Insoluble | — | — | — | — |
| 3 | 0.04 | — | 0.06 | 93 | 0.005 | 0.095 | Insoluble | — | — | — | — |

(1) 2,2-Bis(3, 4-dicarboxyphenyl)perfluoropropane dianhydride
(2) 1,3-Bis(3,4-dicarboxyphenyl)-1,1,3,3-tetramethyldisiloxane dianhydride
(3) 3,3',4,4'-Biphenyltetracarboxylic acid dianhydride
(4) Diaminosiloxane [the compound of formula (9') in which m (on the average) is as shown in the table]
(5) 2,2-Bis[4-(4-aminophenoxy)phenyl]propane; but in Example 3, only, 2,2-bis[4-(4-aminophenoxy)perfluoropropane
*(m): degree of polymerization
**adhesion: Evaluation by a cross cut peel test. SiO₂ is formed on silicon wafers.

Examples 5 to 8 shown below are instances in which 4,4'-diaminobenzanilide, a starting material for the aromatic residual group of formula (5) previously shown, is used in combination as the diamine component.

Example 5

Preparation of polyimide resin:

Into a flask having a stirrer, a thermometer and a nitrogen replacing device, 31.1 g (0.07 mol) of 2,2-bis (3,4-dicarboxyphenyl)perfluoropropane dianhydride, 12.8 g (0.03 mol) of 1,3-bis(3,4-dicarboxyphenyl)-1,1,3,3-tetramethyldisiloxane dianhydride and 270 g of cyclohexanone were charged.

Subsequently, a solution prepared by dissolving 49.1 g (0.01 mol) of diaminosiloxane [the compound of formula (9') in which m is 64 on the average], 24.6 g (0.06 mol) of 2,2-bis[4-(4-aminophenoxy)phenyl]propane and 6.8 g (0.03 mol) of 4,4'-diaminobenzanilide in 120 g of cyclohexanone was dropwise added into the above flask while controlling the temperature of the reaction system so as not to become higher than 50° C. After the dropwise addition was completed, the mixture was further stirred at room temperature for 10 hours.

Next, a reflux condenser having a water acceptor was attached to the flask. Thereafter, 30 g of xylene was added, and the temperature was raised to 150° C. which temperature was maintained for 6 hours. As a result, a yellowish brown solution was obtained. Also, 3.5 g of water was produced in the water acceptor.

The yellowish brown solution thus obtained was cooled to room temperature (25° C.), and thereafter put into methanol to effect re-sedimentation. The sediment obtained was dried to obtain 104 g of polyimide resin having a repeating unit represented by the formula:

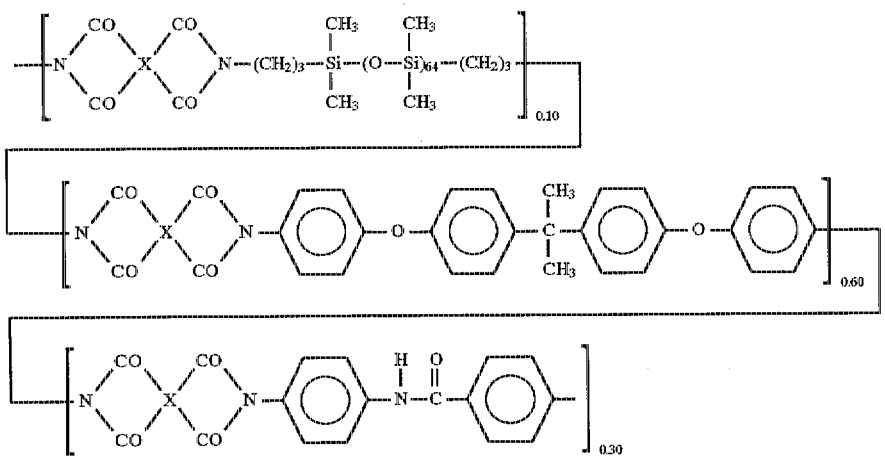

wherein X's are each independently a tetravalent organic group represented by the formula:

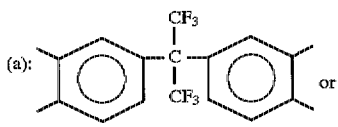

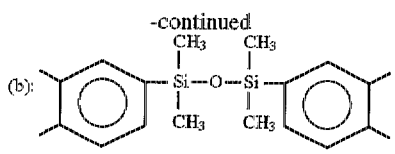

and having a molar ratio of (a)/(b) of 70/30.

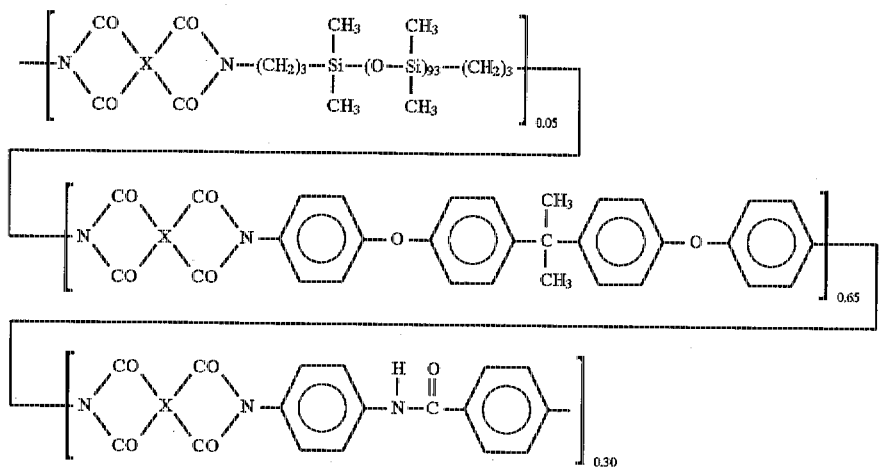

An infrared absorption spectrum of the resin obtained by re-sedimentation was measured. As a result, the absorption based on polyamic acid showing that unreacted functional groups were present did not appear, and the absorption based on imide groups was confirmed at 1,780 $cm^{-1}$ and 1,720 $cm^{-1}$.

Weight average molecular weight (in terms of polystyrene) of the resin was measured by gel permeation chromatography (GPC) using tetrahydrofuran as solvent to reveal that it was 32,000.

Preparation of polyimide resin composition:

In 80 g of cyclohexanone, 20 g of the above resin was dissolved. As a result, it well dissolved, and a composition solution having a polyimide resin concentration of 20% by weight was obtained.

Formation of polyimide resin coatings:

Surface properties of coatings obtained by coating the above composition on base materials were tested according to the following procedure.

First, to the composition solution, γ-butyrolactone was added to prepare a dilute solution having a polyimide resin concentration of 12% by weight (in terms of solid matter).

Next, this dilute solution was coated on base materials comprised of $SiO_2$ formed on silicon wafers and base materials made of copper, and the coated surfaces were left to dry in an environment of temperature 23° C./relative humidity 50%. Color and smoothness of the coatings thus dried were visually evaluated. The results obtained are shown in Table 2.

Formation of cured polyimide resin films:

In respect of cured polyimide resin films obtained by further heating the above coatings, their adhesion to the base materials under moisture-resistant conditions was tested according to the following procedure.

First, the temperature of coatings was raised to 180° C., which temperature was maintained for 1 hour to form cured resin films. The cured resin films formed were examined by a pressure cooker test under conditions of 121° C., 2 atmosphere and 24 hours, and their adhesion was evaluated by a cross cut peel test (JIS 5400).

The results of the cross cut peel test were 100/100, showing an excellent adhesion.

Example 6

A polyimide resin having a repeating unit represented by the formula:

wherein X's are each independently a tetravalent organic group represented by the formula:

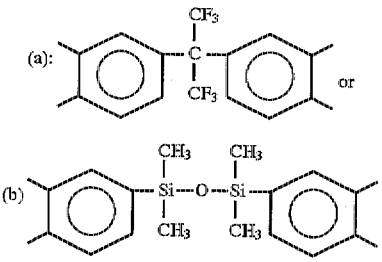

and having a molar ratio of (a)/(b) of 70/30; was prepared under the same conditions (conditions for polycondensation reaction) as in Example 5 except that 31.1 g (0.07 mol) of 2,2-bis(3,4-dicarboxyphenyl) perfluoropropane dianhydride and 12.8 g (0.03 mol) of 1,3-bis (3,4-dicarboxyphenyl)-1,1,3,3-tetramethyldisiloxane dianhydride, as well as 35.3 g (0.005 mol) of diaminosiloxane [the compound of formula (9) in which m is 93 on the average], 26.7 g (0,065 mol) of 2,2-bis[4-(4-aminophenoxy)phenyl]propane and 6.8 g (0.03 mol) of 4,4'-diaminobenzanilide, and also 470 g of cyclohexanone were used.

Weight average molecular weight of the resin thus obtained was measured in the same manner as in Example 5 to reveal that it was 51,000.

Next, a polyimide resin composition solution having a polyimide resin concentration of 20% by weight and, with addition of γ-butyrolactone, a polyimide resin composition dilute solution having a polyimide resin concentration of 12% by weight were prepared in the same manner as in Example 5.

Using base materials comprised of $SiO_2$ formed on silicon wafers and base materials made of copper, polyimide resin coatings and cured polyimide resin films were tested in the same manner as in Example 5. The results obtained are shown in Table 2.

Example 7

A polyimide resin having a repeating unit represented by the formula:

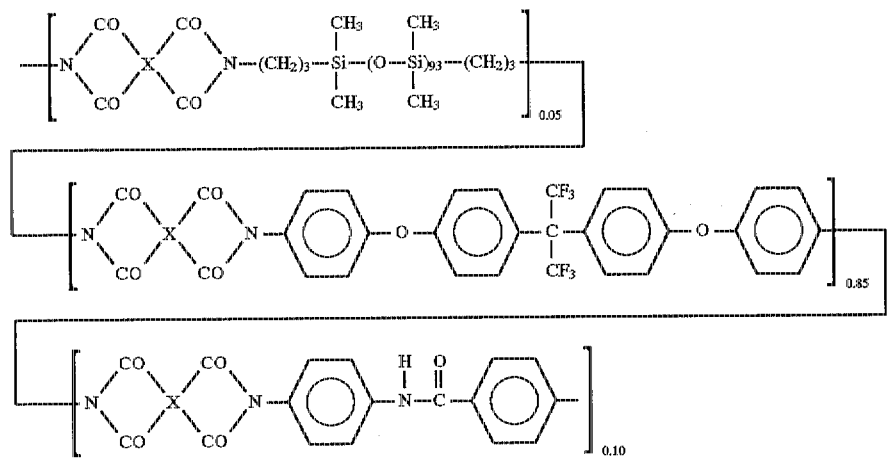

wherein X's are each independently a tetravalent organic group represented by the formula:

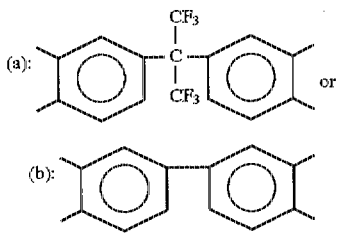

and having a molar ratio of (a)/(b) of 90/10; was prepared under the same conditions (conditions for polycondensation reaction) as in Example 5 except that 40.0 g (0.09 mol) of 2,2-bis(3,4-dicarboxyphenyl) perfluoropropane dianhydride, 2.9 g (0.01 mol) of 3,3',4,4'-biphenyltetracarboxylic acid dianhydride, 35.3 g (0.005 mol) of diaminosiloxane [the compound of formula (9) in which m is 93 on the average], 49.3 g (0.085 mol) of 2,2-bis[4-(4-aminophenoxy)phenyl]perfluoropropane, 2.2 g (0.01 mol) of 4,4'-diaminobenzanilide, and 720 g of cyclohexanone were used.

Weight average molecular weight of the resin thus obtained was measured in the same manner as in Example 5 to reveal that it was 103,000.

Next, a polyimide resin composition solution having a polyimide resin concentration of 20% by weight and, with addition of γ-butyrolactone, a polyimide resin composition dilute solution having a polyimide resin concentration of 12% by weight were prepared in the same manner as in Example 5.

Using base materials comprised of $SiO_2$ formed on silicon wafers and base materials made of copper, polyimide resin coatings and cured polyimide resin films were tested in the same manner as in Example 5. The results obtained are shown in Table 2.

Example 8

A polyimide resin having a repeating unit represented by the formula:

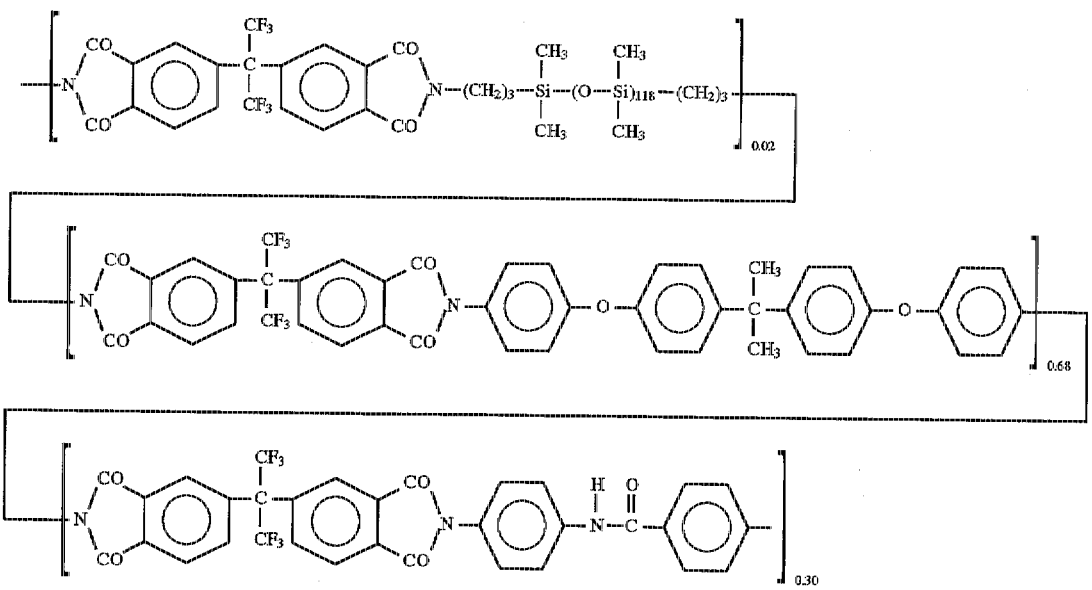

was prepared under the same conditions (conditions for polycondensation reaction) as in Example 5 except that 44.4 g (0.1 mol) of 2,2-bis(3,4-dicarboxyphenyl) perfluoropropane dianhydride, as well as 17.5 g (0.002 mol) of diaminosiloxane [the compound of formula (9) in which m is 118 on the average], 27.9 g (0.068 mol) of 2,2-bis[4-(4-aminophenoxy)phenyl]propane and 6.8 g (0.03 mol) of 4,4'-diaminobenzanilide, and also 410 g of cyclohexanone were used.

Weight average molecular weight of the resin thus obtained was measured in the same manner as in Example 5 to reveal that it was 61,000.

Next, a polyimide resin composition solution having a polyimide resin concentration of 20% by weight and, with addition of γ-butyrolactone, a polyimide resin composition dilute solution having a polyimide resin concentration of 12% by weight were prepared in the same manner as in Example 5.

Using base materials comprised of SiO2 formed on silicon wafers and base materials made of copper, polyimide resin coatings and cured polyimide resin films were tested in the same manner as in Example 5. The results obtained are shown in Table 2.

Comparative Example 4

A polyimide resin having a repeating unit represented by the formula:

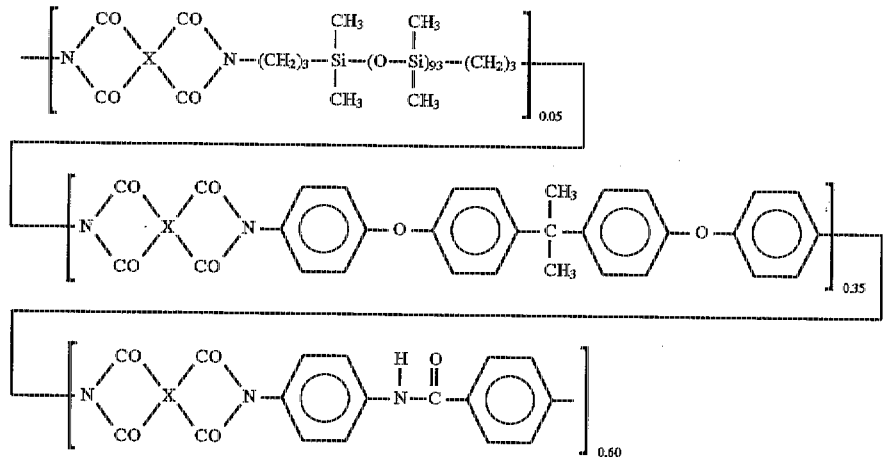

wherein X's are each independently a tetravalent organic group represented by the formula:

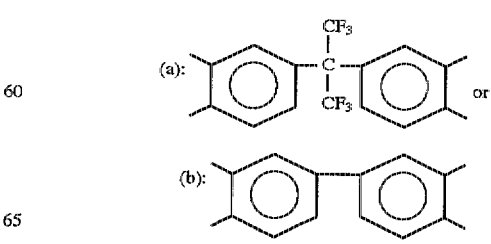

and having a molar ratio of (a)/(b) of 90/10; was prepared under the same conditions (conditions for polycondensation reaction) as in Example 5 except that 40.0 g (0.09 mol) of 2,2-bis(3,4-dicarboxyphenyl) perfluoropropane dianhydride and 2.9 g (0.01 mol) of 3,3',4,4'-biphenyltetracarboxylic acid dianhydride, as well as 35.3 g (0.005 mol) of diaminosiloxane [the compound of formula (9) in which m is 93 on the average], 14.4 g (0.035 mol) of 2,2-bis[4-(4-aminophenoxy)phenyl]propane and 13.6 g (0.06 mol) of 4,4'-diaminobenzanilide, and also 720 g of cyclohexanone were used.

This resin did not dissolve in cyclohexanone, and it was impossible to prepare any polyimide resin composition solution.

The resin was also insoluble in tetrahydrofuran, and hence it was impossible to determine the molecular weight of the resin by gel permeation chromatography.

Comparative Example 5

A polyimide resin having a repeating unit represented by the formula:

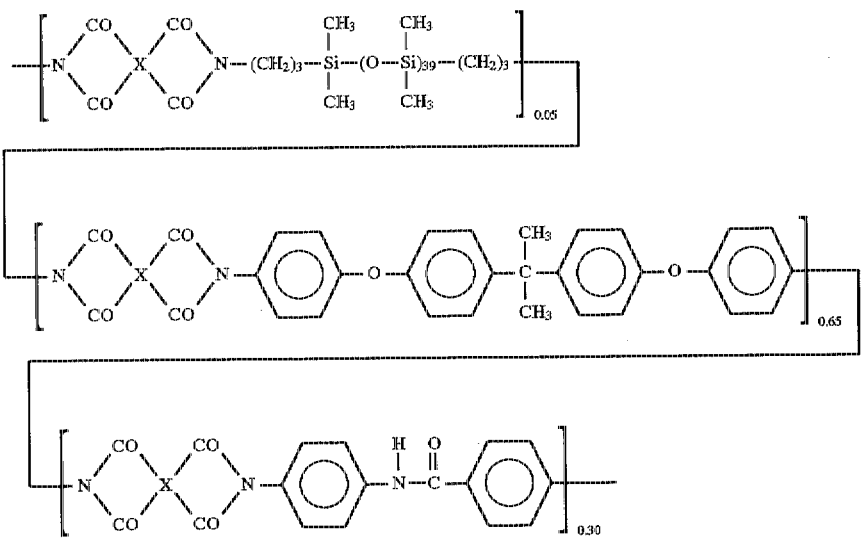

wherein X's are each independently a tetravalent organic group represented by the formula:

(a):

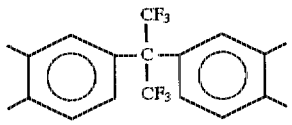

or (b):

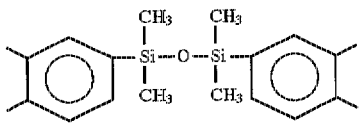

and having a molar ratio of (a)/(b) of 70/30; was prepared under the same conditions (conditions for polycondensation reaction) as in Example 5 except that 31.1 g (0.07 mol) of 2,2-bis(3,4-dicarboxyphenyl) perfluoropropane dianhydride and 12.8 g (0.03 mol) of 1,3-bis (3,4-dicarboxyphenyl)-1,1,3,3-tetramethyldisiloxane dianhydride, as well as 15.3 g (0.005 mol) of diaminosiloxane [the compound of formula (9) in which m is 39 on the average], 26.7 g (0.065 mol) of 2,2-bis[4-(4-aminophenoxy)phenyl]propane and 6.8 g (0.03 mol) of 4,4'-diaminobenzanilide, and also 440 g of cyclohexanone were used.

Weight average molecular weight of the resin thus obtained was measured in the same manner as in Example 5 to reveal that it was 72,000.

Next, a polyimide resin composition solution having a polyimide resin concentration of 20% by weight and, with addition of γ-butyrolactone, a polyimide resin composition dilute solution having a polyimide resin concentration of 12% by weight were prepared in the same manner as in Example 5.

Using base materials comprised of $SiO_2$ formed on silicon wafers and base materials made of copper, polyimide resin coatings and cured polyimide resin films were tested in the same manner as in Example 5. The results obtained are shown in Table 2.

TABLE 2

| | Acid dianhydride (mol) | | | Diamine (mol) | | | | Solubility in cyclohexanone | Surface properties of polyimide resin coatings | Film adhesion** Base material SiO$_2$ | Base Material: copper |
|---|---|---|---|---|---|---|---|---|---|---|---|
| | (1) | (2) | (3) | m* | (4) | (5) | (6) | | | | |
| Example | | | | | | | | | | | |
| 5 | 0.07 | 0.03 | — | 64 | 0.01 | 0.060 | 0.03 | Good | Transparent, smooth | 100/100 | 100/100 |
| 6 | 0.07 | 0.03 | — | 93 | 0.005 | 0.065 | 0.03 | Good | Transparent, smooth | 100/100 | 100/100 |
| 7 | 0.09 | — | 0.01 | 93 | 0.005 | 0.085 | 0.01 | Good | Transparent, smooth | 100/100 | 100/100 |
| 8 | 0.10 | — | — | 118 | 0.002 | 0.068 | 0.03 | Good | Transparent, smooth | 100/100 | 100/100 |
| Comparative Example | | | | | | | | | | | |
| 4 | 0.09 | — | 0.01 | 93 | 0.005 | 0.035 | 0.06 | Insoluble | — | — | — |
| 5 | 0.07 | 0.03 | — | 39 | 0.005 | 0.065 | 0.03 | Good | Transparent, smooth | 0/100 | 0/100 |

(1) 2,2-Bis(3,4-dicarboxyphenyl)perfluoropropane dianhydride
(2) 1,3-Bis(3,4-dicarboxyphenyl)-1,1,3,3-tetramethyldisiloxane dianhydride
(3) 3,3',4,4,-Biphenyltetracarboxylic acid dianhydride
(4) Diaminosiloxane [the compound of formula (9) in which m (on the average) is as shown in the table]
(5) 2,2-Bis[4-(4-aminophenoxy)phenyl]propane; but in Example 7 only, 2,2-bis[4-(4-aminophenoxy)perfluoropropane (6) 4,4'-Diaminobenzanilide
*(m): degree of polymerization
**adhesion: Evaluation by a cross cut peel test. SiO$_2$ is formed on silicon wafers.

What is claimed is:

1. A polyimide resin composition comprising:
(A) a polyimide resin consisting essentially of a repeating unit represented by the general formula (1):

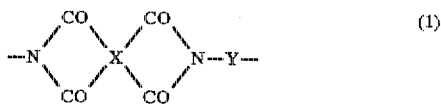

wherein
X represents a tetravalent organic group containing as an essential constituent group not less than 50 mol % of a 2,2-diphenyl perfluoropropane residual group represented by the formula (2):

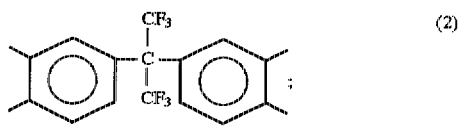

Y represents a divalent organic group comprising from 2 mol % to 10 mol % of a divalent siloxane residual group represented by the formula (3):

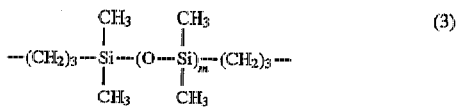

wherein m is an integer of 60 to 120;
and from 90 mol % to 98 mol % of a divalent aromatic group selected from the group consisting of a divalent aromatic group represented by the formula (4):

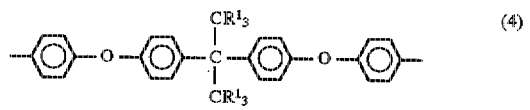

wherein $R^1$ represents a hydrogen atom or a fluorine atom; and a divalent aromatic group represented by the formula (5):

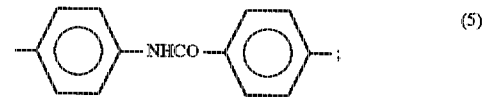

provided that the aromatic group of formula (4) is in an amount of from 50 mol % to 100 mol % in the total of the aromatic group of formula (4) and aromatic group of formula (5); and
(B) cyclohexanone.

2. The composition according to claim 1, wherein said tetravalent organic group represented by X contains the 2,2-diphenyl perfluoropropane residual group of formula (2) in an amount of from 50 mol % to 100 mol %.

3. The composition according to claim 2, wherein said tetravalent organic group represented by X contains the 2,2-diphenyl perfluoropropane residual group of formula (2) in an amount of from 70 mol % to 80 mol %.

4. The composition according to claim 1, wherein said tetravalent organic group represented by X in the general formula (1) contains, in addition to not less than 50 mol % of the 2,2-diphenyl perfluoropropane residual group of formula (2), not more than 50 mol % of at least one group of a siloxane-containing group represented by the formula (6):

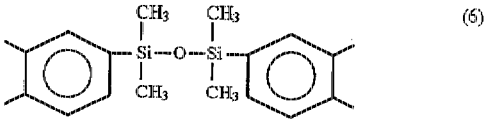

and a biphenyl group represented by the formula (7):

5. The composition according to claim 1, wherein said divalent organic group represented by Y in the general formula (1) consists of from 2 mol % to 10 mol % of the divalent siloxane residual group of formula (3) and from 90 mol % to 98 mol % of the divalent aromatic group of formula (4).

6. The composition according to claim 1, wherein said divalent organic group represented by Y in the general formula (1) consists of from 2 mol % to 10 mol % of the divalent siloxane residual group of formula (3) and from 90 mol % to 98 mol % of the divalent aromatic group of formula (4) and divalent aromatic group of formula (5) in total, provided that the aromatic group of formula (5) is in an amount of from 10 mol % to 50 mol % in the total of the aromatic group of formula (4) and aromatic group of formula (5).

7. The composition according to claim 1, wherein said polyimide resin of component (A) has a weight average molecular weight of from 10,000 to 150,000.

8. The composition according to claim 1, which contains an organic solvent in addition to said cyclohexanone, and the cyclohexanone is in an amount not less than 30% by weight in the total solvent.

9. The composition according to claim 1, wherein said polyimide resin of component (A) is in a concentration of from 1% by weight to 30% by weight.

10. A polyimide resin film obtained by coating the composition of claim 1 on a base material, followed by heating at a temperature of from 150° C. to 200° C.

* * * * *